United States Patent
Abramowsky et al.

(10) Patent No.: US 6,523,796 B2
(45) Date of Patent: Feb. 25, 2003

(54) PIVOT MOUNTING ASSEMBLY

(75) Inventors: Heinz Abramowsky, Giengen (DE); Gunter Grubauer, Neresheim (DE); Michael Wirth, Aalen (DE); Jörg Bröckel, Gerstetten (DE); Roland Brenner, Wallhausen (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 10/040,978

(22) Filed: Oct. 19, 2001

(65) Prior Publication Data

US 2002/0100851 A1 Aug. 1, 2002

(30) Foreign Application Priority Data

Oct. 19, 2000 (DE) .......................... 100 51 892

(51) Int. Cl.⁷ ................................ E04G 3/00
(52) U.S. Cl. .............................. 248/284.1; 248/123.11; 248/280.1; 248/291.1; 248/292.11
(58) Field of Search .................. 248/284.1, 123.11, 248/123.2, 291.1, 292.11, 297.21, 278.1, 292.13, 281.11, 280.11, 276.1, 297.11, 560, 887; 211/18, 104

(56) References Cited

U.S. PATENT DOCUMENTS

| | | | | |
|---|---|---|---|---|
| 4,759,674 A | * | 7/1988 | Schroder et al. | 248/123.2 |
| 5,054,725 A | * | 10/1991 | Bucefari et al. | 248/123.11 |
| 5,213,293 A | * | 5/1993 | Muentener et al. | 248/123.11 |
| 5,253,832 A | * | 10/1993 | Bolas et al. | 248/123.11 |
| 5,662,256 A | * | 9/1997 | Bryan | 211/18 |
| 5,746,404 A | * | 5/1998 | Merko | 248/123.11 |
| 6,070,839 A | * | 6/2000 | Brenner et al. | 248/123.11 |
| 6,082,552 A | * | 7/2000 | Pollock et al. | 211/104 |

FOREIGN PATENT DOCUMENTS

| EP | 0 433 426 B1 | 6/1991 |
|---|---|---|
| EP | 0 866 260 A1 | 9/1998 |

* cited by examiner

Primary Examiner—Leslie A. Braun
Assistant Examiner—Tan Le
(74) Attorney, Agent, or Firm—Rosenthal & Osha L.L.P.

(57) ABSTRACT

A pivot mounting assembly is provided including a pivot arm (5) hinged to a pivot base (3) for mounting a load in a vertically adjustable manner. A first force-providing device (13) is hinged with its first operative end to the pivot arm and is supported with its second (17) operative ends on the pivot base for providing an antitorque moment to at least partially compensate for a torque imparted by the load on the pivot arm. The pivot base is provided with a support surface (27) in which the support location (49) for the second operative end is shiftable. A second force-providing device (36) is provided for generating a shifting force the second operative end of the first force-providing device.

13 Claims, 6 Drawing Sheets

Fig. 1a

(PRIOR ART)

Fig. 1b

(PRIOR ART)

PIVOT MOUNTING ASSEMBLY

FIELD OF THE INVENTION

The invention relates to a pivot mounting assembly comprising a pivot arm for mounting a load in a vertically adjustable manner, said pivot arm being hinged to a pivot base to be pivotable about a horizontal axis. In particular, the pivot mounting assembly is suitable to be used in stands to mount, for example, lamps, visual display units and other devices, such as surgical microscopes which are to be provided vertically adjustable.

BACKGROUND OF THE INVENTION

Figure 1A:
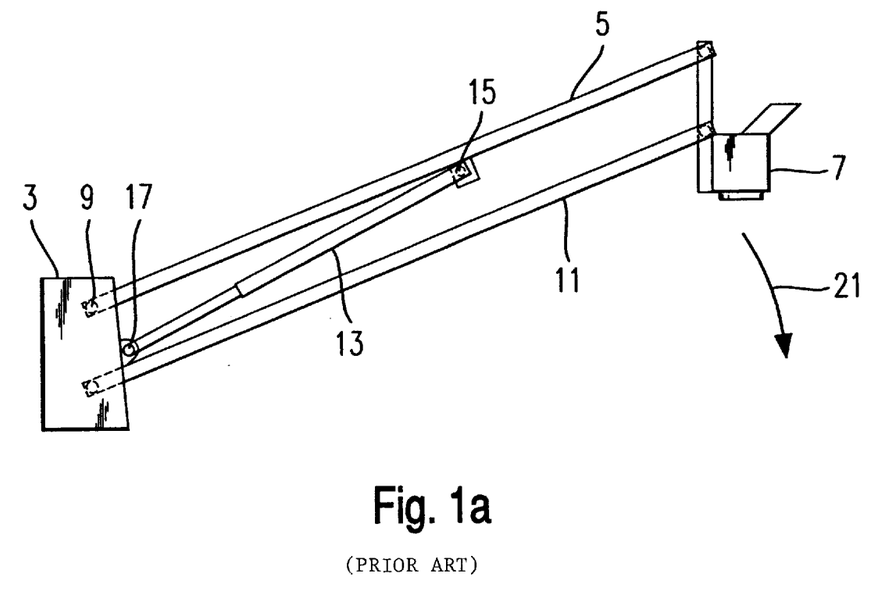
FIGS. 1a and 1b show a conventional pivot mounting assembly.
Figure 1B:
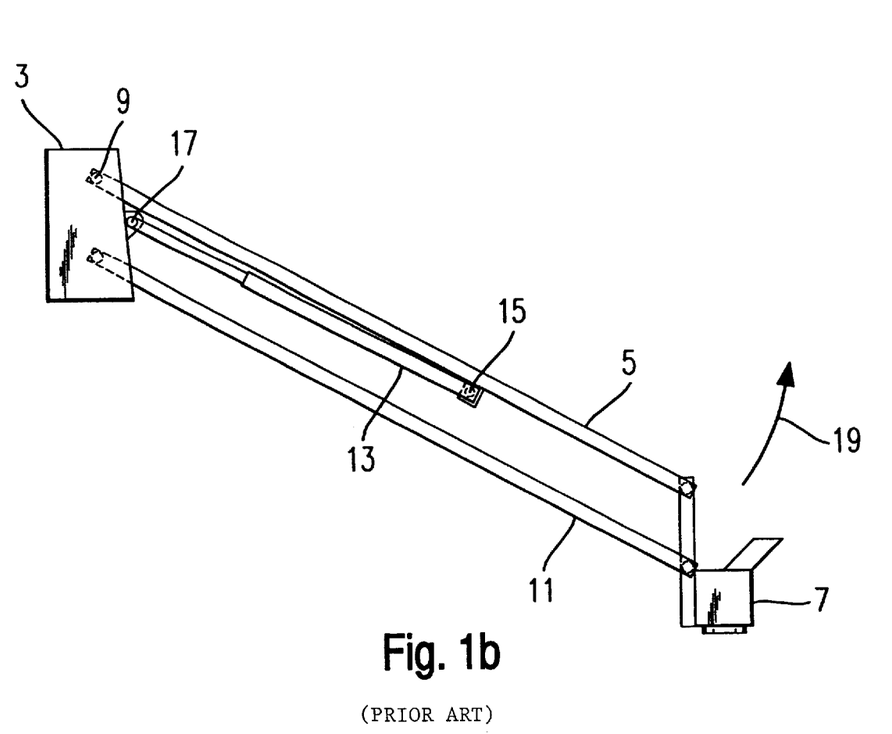

FIGS. 1a and 1b schematically show a conventional pivot mounting assembly comprising a pivot base 3 and a pivot arm 5 for mounting a load in vertically adjustable manner, here for example, a surgical microscope 7, in a position in which the pivot arm is raised (FIG. 1a) and in a position in which the pivot arm is lowered (FIG. 1b). One end of the pivot arm 5 is hinged to the pivot base 3 to be pivotable about a horizontal axis 9, and the other end supports the surgical microscope 7.

An auxiliary arm 11 is coupled parallel to the pivot arm 5 such that a vertical alignment of the surgical microscope 7 is maintained independent of the pivot position of the pivot arm 5.

The weight of the surgical microscope imparts a torque on the pivot arm about the pivot axis 9 which is largely compensated for by a force-providing device 13 in the form of a gas pressure spring, so that, if the frictional forces provided in the hinges of the pivot mounting assembly are sufficiently strong, the pivot arm largely remains in pivot positions adjusted by a user. For this purpose, one operative end 15 of the gas spring 13 is hinged to the pivot arm 5 in an area remote from the pivot axis 9, and the other operative end 17 of the gas pressure spring 13 is hinged to the pivot base 3 vertically spaced apart from the pivot axis 9. The compressive force of the gas spring imparts an antitorque moment on the pivot arm to compensate for the weight of the load 7.

However, as regards the compensation of the weight of the load independent of the pivot position, it has been found that the action of the force-providing device 13 in a lower pivot position is too strong, so that the pivot arm moves automatically upward in a direction indicated by an arrow 19 in FIG. 1b, and that the action of the force-providing device in an upper pivot position is too little, so that the arm automatically moves downward in a direction indicated by an arrow 21 in FIG. 1a. In order to prevent such automatic movement, usually the frictional forces in the hinges are increased which, however, impairs a smooth and precise adjustment of a desired pivot position by the user.

As to a solution of this problem, EP 0 433 426 A1 discloses a pivot mounting assembly, wherein the operative end of the force-providing device on the pivot base side is not hinged to the pivot base at a fixed location, but engages with a pin into an elongated, vertically extending hole provided in the pivot base, so that a vertical distance between a location where the force-providing device is supported on the pivot base and the horizontal axis is adjustable. The elongated hole has a specific curved configuration in order for the vertical distance between the support location and the horizontal axis to automatically change dependent on the pivot position of the pivot arm to thereby achieve an adjustment of the torque provided by the force-providing device dependent on the pivot position. However, it has been found in this respect that the movement of the operative end of the force-providing device on the pivot base side in the elongated hole dependent on the pivot position of the pivot arm is not precise enough, so that with reduced frictional forces, a compensation of the weight of the load independent of the pivot position is not adequately achieved.

SUMMARY OF THE INVENTION

In some embodiments, the invention provides a pivot mounting assembly which is adjustable with more ease.

In some embodiments, the invention provides a pivot mounting assembly of the above-described kind which enables a compensation of the weight of the load to be supported largely independent of the pivot position.

In some embodiments, the invention provides a pivot mounting assembly comprising a pivot arm for mounting a load in vertically adjustable manner, said pivot arm being hinged to a pivot base to be pivotable about a horizontal axis. In order to provide an antitorque moment to at least partially compensate for the torque imparted by the load on the pivot arm, a force-providing device, such as a coil pressure spring or a gas pressure spring, is provided, one operative end of which is hinged to the pivot arm spaced apart from the horizontal axis and the other operative end is supported on the pivot base vertically spaced apart from the horizontal axis. In this respect, a support location of the operative end of the force-providing device on the pivot base side is provided vertically adjustable on the pivot base in that a support surface extending transverse to the horizontal direction is provided on the pivot base, the support location of the force-providing device being shiftable along said support surface. The support surface is oriented such that, when the pivot arm is raised, the support location is moved downward, and, when the pivot arm is lowered, the support location is moved upward, in order for the antitorque moment to be adjusted dependent on the pivot position such that automatic movements of the pivot arm in its raised position or lowered position are suppressed.

According to embodiments of the invention, a second force-providing device is provided for producing a counterforce in at least a partial area of the support surface in order to prevent a downward or/and upward shift of the support location.

This counterforce provided by the second force-providing device allows a continuous and well-defined shift of the support location along the support surface at least in said partial area of the support surface dependent on the pivot position, and thus enables a compensation of the weight of the load to be held which is largely independent of the pivot position of the pivot arm and thus nearly flawless.

In some embodiments, the second force-providing device is a double-acting force-providing device which is configured such that it acts to hold the support location in a center of a shift area provided on the support surface for the support location, the second force-providing device preferably providing a counterforce which increases as the support location is shifted further from the center. To this end, the second force-providing device may comprise a spring assembly preferably comprising at least a pressure spring or a tension spring.

In some embodiments, the pivot mounting assembly is provided such that it is capable of compensating for loads of different magnitude. For this purpose, there is provided a drive which moves the shift area as such in which the support location is shiftable along the support surface in vertical direction relative to the horizontal axis. If the shift area as such is vertically spaced apart from the horizontal axis by a larger distance below the same, the pivot mounting assembly can compensate for larger loads than if the shift area is positioned closer to the horizontal axis.

With a given range in which the antitorque moment or the load to be compensated for is adjustable, the forces provided by the first force-providing device and the second force-providing device are preferably adjusted to each other such that the maximum counterforce of the second force-providing device is higher than the deflection force acting on the operative end of the force-providing device on the pivot base side due to the slope of the support surface for shifting the support location along the support surface. As a result, the current support location is well-defined by an equilibrium of the spring forces which results into a maximum compensation of the load weight independent of the pivot position. Preferably, this force adjustment is fulfilled for a partial area of the shift area and, particularly preferred, for the entire shift area. Moreover, this force adjustment is fulfilled at least for small adjustable antitorque moments and, particularly preferred, for all adjustable antitorque moments.

In some embodiments, a pair of end stops is further provided for a component of the operative end of the force-providing device on the pivot base side for delimiting the shift area as partial area of the support surface. In this respect, it is preferred that for the pair of end stops to be shiftable by the drive in vertical direction. The component of the end of the force-providing device on the pivot base side preferably contacts one of the end stops if the counterforce of the second force-providing device is insufficient to compensate for the deflection force caused by the slope of the support surface.

In some embodiments, the drive for shifting the shift area and the second force-providing device are functionally connected in series. In this respect, it is preferred that, in drive direction, one of the two operative ends of the drive is fixedly coupled to the end of the first force-providing device supported on the pivot base and the other operative end is hinged to the pivot base, with the second force-providing device being interposed. Alternatively, it is preferred that one of the two operative ends of the drive is hinged to the pivot base and the other operative end is coupled to the end of the first force-providing device supported on the pivot base, with the second force-providing device being interposed.

In one aspect, an embodiment of the end stops is obtained if at least one of the two end stops is provided by a pressure spring of the second force-providing device which embodies the end stop if it is completely compressed.

Moreover, in some embodiments, the drive may be a spindle drive, the spindle of which passes through coil springs of the second force-providing device in longitudinal direction thereof.

According to another embodiment of the pivot mounting device, the support area is provided on a carriage which is vertically shiftable in respect of the horizontal axis by means of the drive.

As to the geometric configuration of the support surface, shapes are preferred wherein a normal to the support surface slopes upward.

BRIEF DESCRIPTION OF THE DRAWINGS

The present invention will be described below with reference to exemplary embodiments and the accompanying drawings, wherein.

DETAILED DESCRIPTION

Figure 2A:
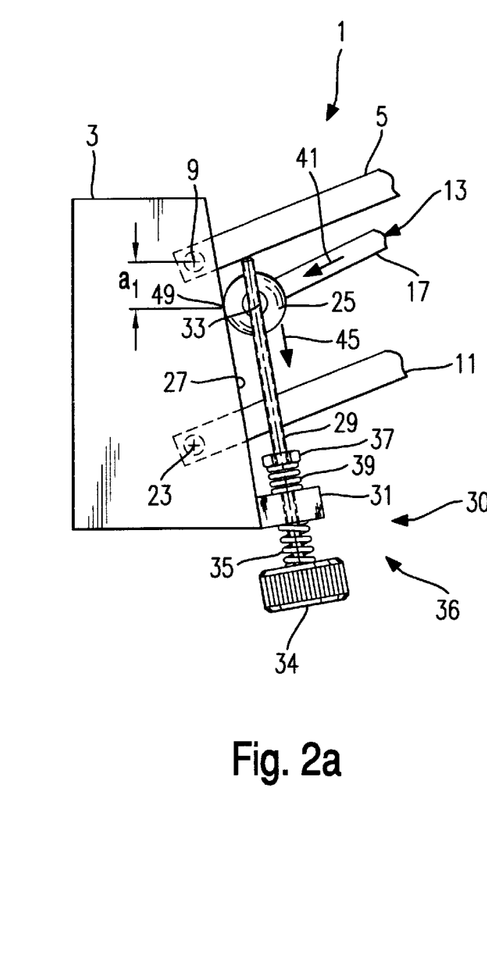
FIGS. 2a–2c show a partial view of a first embodiment of the pivot mounting assembly according to the invention in various pivot positions adjusted to hold a small load.
Figure 2B:
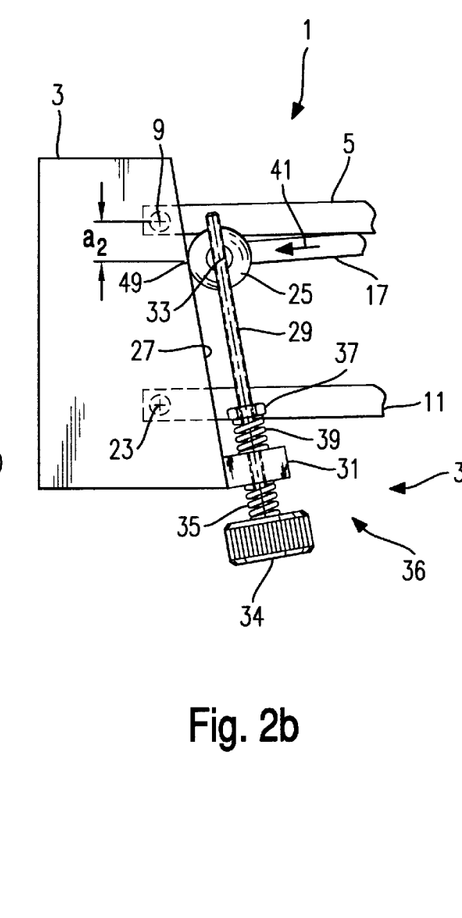
Figure 2C:
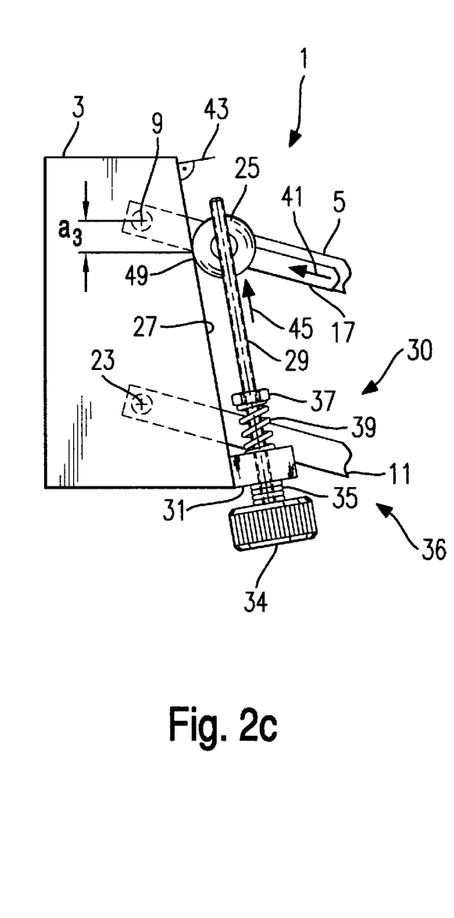

FIGS. 2a, 2b and 2c show a first embodiment of the pivot mounting assembly 1 according to the invention, each in partial view. The basic structure of the pivot mounting assembly 1 is similar to that of the conventional pivot mounting assembly described with reference to FIGS. 1a and 1b and comprises a pivot base 3 and a pivot arm 5 which is hinged to the pivot base to be pivotable about a horizontally oriented axis 9. FIGS. 2a to 2c each show that portion of the pivot mounting assembly which is close to the pivot base 3 as a partial view, whereas a portion of the pivot arm 5 where the load is mounted and which is remote from the pivot base 3 is not shown for reasons of simplicity. As far as the mounting of the load to a portion of the pivot arm 5 remote from the pivot base is concerned, direct reference can be taken to FIGS. 1a and 1b, because it is accomplished in the first embodiment described herein in similar fashion. In order for the load to be vertically oriented independent of the pivot position of the pivot arm 5, there is likewise provided an auxiliary arm 11 which extends parallel to the pivot arm 5 and is hinged to the pivot base 3 spaced apart form the horizontal axis 9 to rotate about a further pivot axis 23. Just as in the pivot mounting assembly shown in FIG. 1, a gas pressure spring 13 is provided as a first force-providing device which is hinged with one operative end to the pivot arm 5 spaced apart from the horizontal axis 9 and imparts with its other operative end 17 a force of pressure on the pivot base 3.

In contrast to the conventional pivot mounting assembly shown in FIG. 1, in the pivot mounting assembly 1 of the invention, the operative end 17 of the gas pressure spring 13 on the pivot base side, however, is not fixedly hinged to the pivot base 3, but is vertically shiftable in respect of the pivot base. To this end, a roller 25 is supported at the operative end 17 of the gas pressure spring 13 on the pivot base side to be rotatable about a horizontal axis, said roller being capable of rolling on a support surface 27 provided on the pivot base 3. As a result, a point of contact 49 between the roller 25 and the support surface 27, i.e., the location where the end 17 of the pressure spring 13 on the pivot base side is supported on the support surface 27, is shiftable along the support surface 27, so that a distance a between the pivot axis 9 of the pivot arm 5 and the support location 49 is likewise variable in vertical direction.

In FIG. 2a the pivot arm 5 is disposed in an upward-sloping pivot position, in FIG. 2b the pivot arm is disposed in an approximately horizontal pivot position, and in FIG. 2c the pivot arm is disposed in a downward-sloping pivot position. Dependent on the pivot position, the distance a between the horizontal axis 9 and the support location of the roller 2 on the support surface 27 varies such that said distance continuously decreases as the pivot arm 5 passes through pivot positions from the top to the bottom. Accordingly, the distance al in FIG. 2a is larger than the distance a2 in FIG. 2b, and the latter is again larger than the distance a3 in FIG. 2c. As the antitorque moment imparted by the gas pressure spring 13 on the pivot arm 5 is dependent on the distance a between the horizontal axis 9 and the support location, the antitorque moment is greater in a pivot position in which the pivot arm 5 is raised than in a pivot position in which the pivot arm is lowered. As a result, an automatic downward movement of the pivot arm is diminished when the pivot arm is in a raised position (see arrow 21 in FIG. 1), just as an automatic upward movement is prevented when the pivot arm has assumed a lowered position (see arrow 19 in FIG. 1b).

The shift of the support location dependent on the pivot position will be better understood with reference to the following description.

The pivot mounting assembly 1 further comprises a drive 30 to adjust the area in which the support location 49 is shiftable along the support surface 27. The drive 30 comprises a threaded spindle 29 which is operable by a twist handle 34 and passes through a guide sleeve 31 fixed to the pivot base 3, said threaded spindle being oriented substantially parallel to the support surface 27 in a vertical plane. The threaded spindle 29 is slidably guided in the guide sleeve 31 in longitudinal direction thereof. The threaded spindle 29 is threaded into a threaded bore 33 provided in the operative end 17 of the gas pressure spring 13 on the pivot base side, so that a deflection force applied to shift the support location 49 along the support surface 27 likewise results into a displacement of the threaded spindle 29 in longitudinal direction thereof in respect of the guide sleeve 31.

However, the threaded spindle 29 is not freely movable in respect of the pivot base 3. Rather, a second force-providing device in the form of a spring assembly 36 is provided for controlling the movement of the threaded spindle 29.

For this purpose, a coil spring 35 is positioned between the twist handle 34 and the guide sleeve 31 and traverses the threaded spindle 29 in longitudinal direction thereof. Furthermore, a support ring 37 is fixed to the threaded spindle 29 between the guide sleeve 31 and the threaded bore 33, and a further coil spring 39 is disposed between the support ring 37 and the guide sleeve 31, the threaded spindle 29 extending likewise centrally through said coil spring. If no further forces are applied on the threaded spindle 29, the two coil springs 35 and 39 act to shift the threaded spindle 29 into a central position, as is shown in FIG. 2b, in which the two coil springs 39 and 35 are compressed to an approximately equal extent.

As an extension direction of a connecting line between the operative end 17 of the pressure spring 13 on the pivot base side and the operative end of the pressure spring 13 fixed to the pivot arm 5 is shifted together with the extension direction of the pivot arm 5 when the pivot arm 5 is pivoted, a pressure force of the pressure spring 13 indicated by an arrow 41 in combination with the orientation of the support surface 27 (a normal 43 to the support surface 27 is sloped upward, see FIG. 2c) produces a deflection force 45 which acts on the operative end 17 of the pressure spring 13 on the pivot base side parallel to the support surface 27 and is directed downward when the pivot arm 5 is pivoted upward (see FIG. 2a) and upward when the pivot arm 5 is pivoted downward (see FIG. 2c). As the operative end 17 of the pressure spring 13 on the pivot base side rolls on the support surface 27 substantially frictionless via the roller 25, the deflection force 45 is transferred substantially completely to the threaded spindle 29 and acts to move it in respect of the guide sleeve 31. If the deflection force 45 is directed downward, this results into a compression of the upper coil spring 39 such that it provides a counterforce which compensates for the deflection force 45 and an equilibrium of forces is obtained (FIG. 2a). Vice versa, a deflection force 45 which is directed upward (see FIG. 2c) causes the threaded spindle 29 to be moved such that the lower coil spring 35 is compressed to such an extent that it provides a counterforce to the deflection force 45 and an equilibrium of forces is likewise achieved. In the horizontal pivot position of the pivot arm 5 shown in FIG. 2b, the pressure force 41 of the pressure spring 13 acts substantially normal to the support surface 27, so that substantially no deflection force acts in the direction of the threaded spindle 29 or parallel to the support surface 27, and the two coil springs 35 and 39 hold the threaded spindle 29 in the central position shown in FIG. 2b, the compression state of the two springs 35 and 39 being substantially the same.

The above-described interaction between the deflection force 45 imparted by the pressure force 41 and the counterforces provided by the coil springs 35 and 39 results into an adjustment of the distance a between the pivot axis 9 and the support location 49 of the operative end 17 on the support base side of the pressure spring 13 on the support surface 27 which is dependent on the pivot position of the pivot arm 5 and thus to the desired independence of the antitorque moment from the pivot position. This enables a compensation of the weight of the load mounted on the pivot mounting assembly 1 independent of the pivot position, so that the user can position the load at any desired height by pivoting the pivot arm, without the pivot arm moving automatically, and that even if hinges of the pivot mounting assembly provide relatively little friction in respect of pivot motions.

In FIGS. 2a, 2b, 2c the threaded spindle 29 is threaded into the threaded bore 33 only to such an extent that the distance a between the horizontal axis 9 and the support location 49 is relatively small. Accordingly, the antitorque moment produced by the pressure spring 13 is relatively small and the pivot mounting assembly 1 is thus adjusted to compensate for weights of relatively light loads. However, the pivot mounting assembly 1 is also adjustable to compensate for heavier loads through the actuation of the drive 30, as is shown in FIGS. 3a, 3b and 3c again for various pivot positions. To this end, the threaded spindle 29 is threaded further into the threaded bore 33 at the end of the pressure spring 13 on the pivot base side, so that the distance a between the horizontal axis 9 and the support location 49 is larger as compared to FIGS. 2a, 2b, 2c. The antitorque moment produced by the pivot mounting assembly is correspondingly higher, and the assembly 1 is thus adjusted to carry heavier loads. Here, too, the distance a changes dependent on the pivot position of the pivot arm 5, so that, when the pivot arm 5 is raised, this distance (see distance al in FIG. 3a) is larger than it is with horizontally disposed pivot arm 5 (see distance a2 in FIG. 3b), and this distance is again larger than with a lowered pivot arm 5 (see distance a3 in FIG. 3c).

If the assembly is adjusted to heavy loads, the pressure force 41 produced by the pressure spring 13, with the pivot arm 5 extending substantially horizontally, again exerts substantially no deflection force parallel to the support surface 27 on the end 17 of the pressure spring 13 on the pivot base side, so that the two coil springs 35 and 39 hold the threaded spindle 29 in a central position. If, starting from the substantially horizontal position shown in FIG. 3b, the pivot arm 5 is continuously raised, the upper coil spring 39 is increasingly compressed and the distance a between horizontal axis 9 and support location 49 likewise continuously increases to increase the antitorque moment.

Figure 3A:
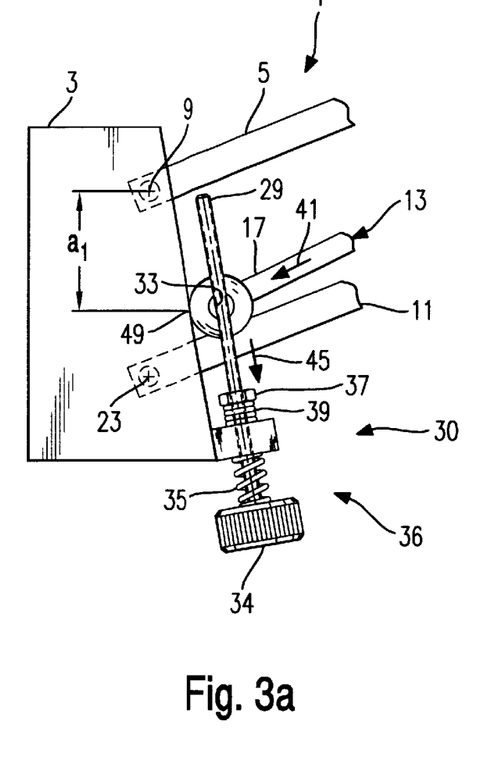
FIGS. 3a–3c show a partial view of the embodiment shown in FIG. 2 in various pivot positions adjusted to hold a heavy load.
Figure 3B:
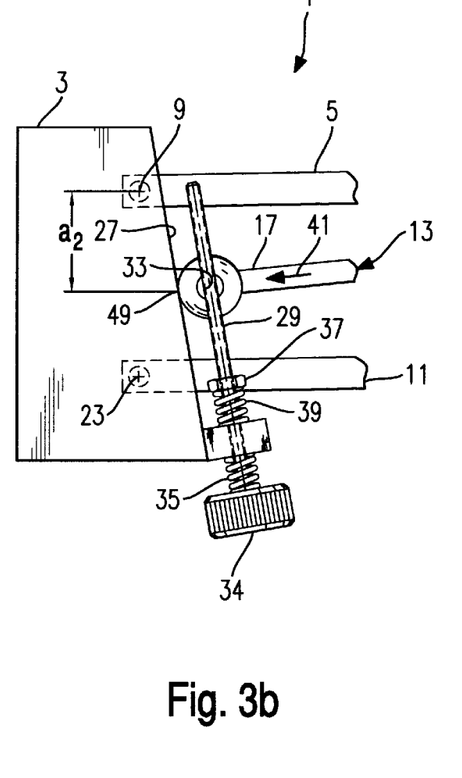
Figure 3C:
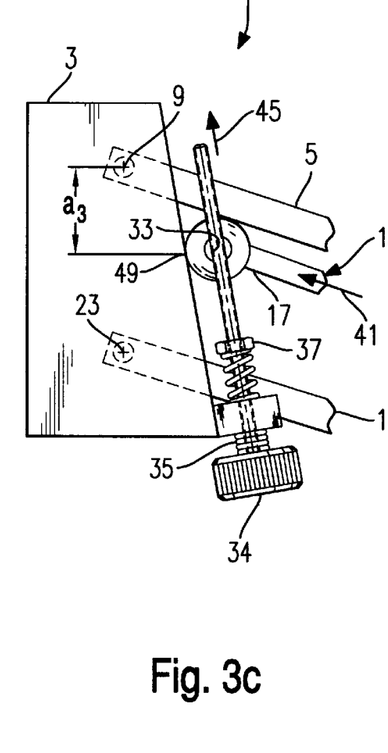

If the pivot arm 5 is raised, as is shown in FIG. 3a, however, the slope of the extension direction of the pressure spring 13 in respect of the support surface 27, which is greater than in FIG. 2a, results into a downwardly directed deflection force 45 which is higher than in FIG. 2a. This comparatively increased deflection force 45 results into a specific raised pivot position of the pivot arm, as is shown in FIG. 3a, in which the deflection force 45 exceeds the maximum counterforce provided by the coil spring 39, and the coil spring 39 is thus completely compressed. The coil spring 39 thus provides an end stop for the downward movement of the support location 49. Correspondingly, in this setting, also when the pivot arm 5 is lowered, the upwardly directed deflection force 45 is increased as compared to FIG. 2c, so that, here, there is a lowered pivot position as from which the lower coil spring 35 is completely compressed and which then provides a corresponding end stop for the upward movement of the support location 49.

In the following, variants of the embodiments of the pivot mounting assembly described with reference to FIGS. 2 and 3 will be described. Components which correspond to each other in structure and function are designated by the same reference numerals as used in FIGS. 2 and 3. However, in order to distinguish the same they are supplemented by an additional letter. For the purpose of illustration, reference is made to the entire above description.

Figure 4:
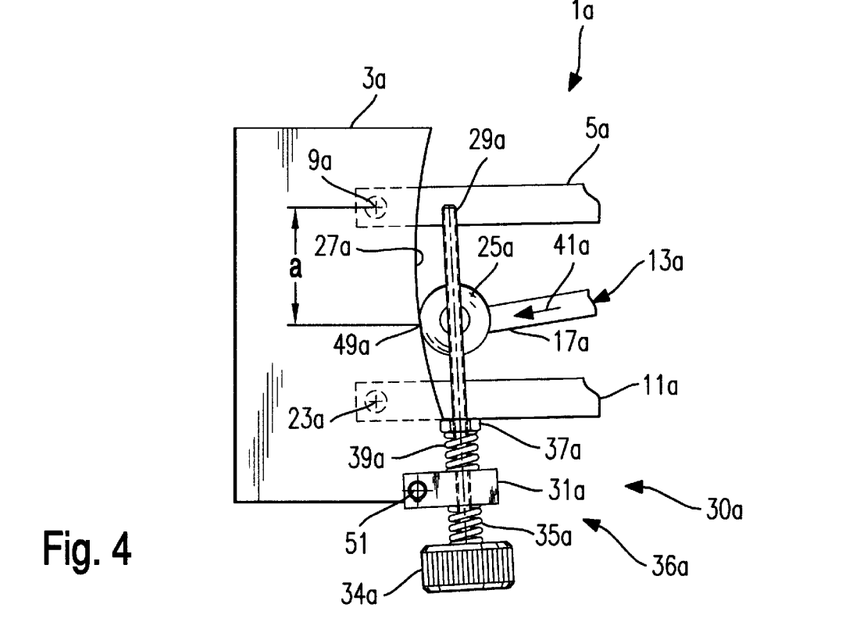
FIG. 4 is a partial view of a second embodiment of the pivot mounting according to the invention.

A pivot mounting assembly 1a shown in partial view in FIG. 4 exhibits substantially the same structure as the pivot mounting assembly shown in FIGS. 2 and 3. In contrast thereto, a support surface 27a provided on a pivot base 3a for supporting a pressure spring 13a on the pivot base 3a, however, does not extend straightly. Rather the support surface 27a of FIG. 4 has a concave curvature. As a result, a deflection force 41a produced by the pressure spring 13 on the end 17a of the pressure spring 13 on the pivot base side in the direction of the support surface 27a is not only dependent on the orientation of the direction of extension of the pressure spring 13a in respect of the pivot base 3a, but also on the support location 49a which adjusts itself on account of the equilibrium of forces between the deflection force and a counterforce produced by coil springs 39a and 35a, because the orientation of the support surface 27a is likewise dependent on the support location 49a. By suitably configuring the curved support surface 27a, an even finer adjustment of the distance a between a pivot axis 9a of the pivot arm 5a and the support location 49a in respect of a compensation of the weight of the load to be mounted independent of the pivot position is rendered possible.

In contrast to the pivot mounting assembly of FIGS. 2 and 3, in the pivot mounting assembly 1a of FIG. 4, a guide sleeve 31a for the threaded spindle 29a of a drive 30a is not fixed to the pivot base 3a, but pivotably hinged thereto via an articulated joint 51, so that the roller 25a coupled to the threaded spindle 29a may roll along the support surface 27a tension-free into a position in which the above-described equilibrium of forces is reached.

Figure 5:
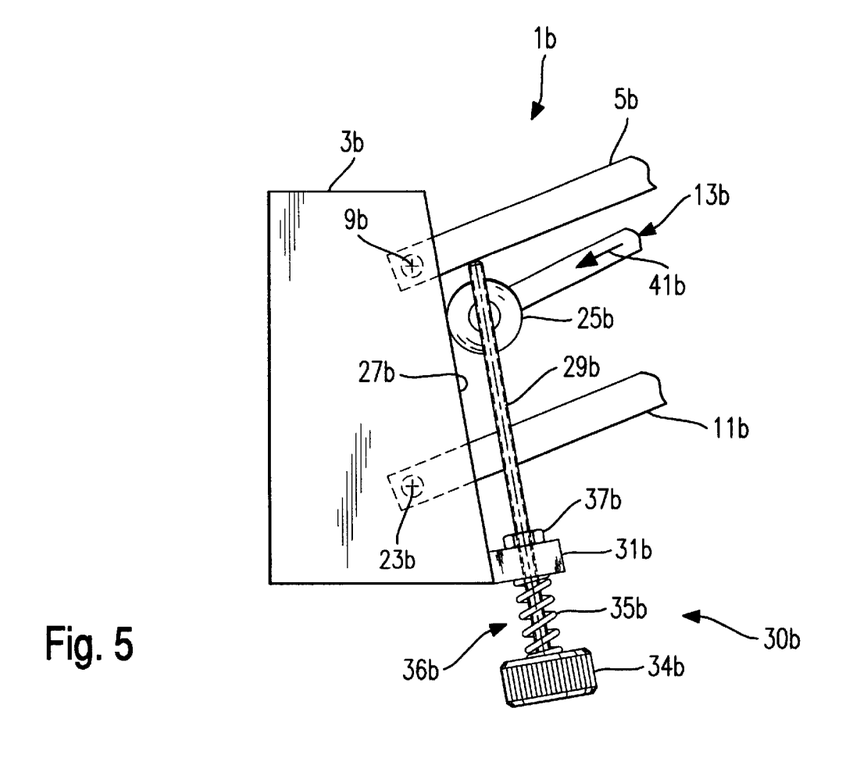
FIG. 5 is a partial view of a third embodiment of the pivot mounting assembly according to the invention.

A pivot mounting assembly 1b shown in FIG. 5 is similar in structure as the pivot mounting assembly shown in FIGS. 2 and 3. In contrast thereto, coil springs are not provided on both sides of a guide sleeve 31b for a threaded spindle 29b for providing a counterforce to the pressure force 41b of a pressure spring 13b. The second force-providing device 36b merely comprises a single coil spring 35b which is provided between the guide sleeve 31b and a twist handle 34b at the end of the threaded spindle 29b. A support ring 37b is again fixed between the guide sleeve 31b and a roller 25b at the operative end of the pressure spring 13b on the pivot base side, said support ring providing an end stop for the downward movement of the threaded spindle 29b. The second force-providing device 36 then merely provides a counterforce to an upward movement of the threaded spindle 29 by means of the coil spring 35b if the same is increasingly compressed by a downward movement of the pivot arm 5b.

If the pressure force 41b of the pressure spring 13b, the slope of the support surface 27b and the spring force of the coil spring 35b are appropriately adjusted to each other, the provision of merely one coil spring for the second force-providing device 36b is sufficient to already achieve a sufficiently accurate compensation of the torque imparted by the load independent of the pivot position of the pivot arm 5b.

In FIGS. 2 and 3 (and also in FIGS. 4 and 5), the threaded spindle 29 together with the threaded bore 33 and the twist handle 34 constitute the drive 30 for varying the range in which the support location 49 is shiftable along the support surface 27. Moreover, the coil springs 35 and 39 positioned between the support ring 37 and the guide sleeve 31 and the guide sleeve and the twist handle 34, respectively, constitute the force-providing device 36 for counteracting a deflection force imparted on the end of the pressure spring 13 on the side of the pivot end. As the threaded spindle 29 is threaded into the threaded bore 33 in the operative direction of the drive 30, the drive 30 is fixedly coupled to the end of the pressure spring 13 on the pivot base side, whereas the second force-providing device 36 comprised of springs 35 and 39 is connected in series, in terms of function, between the drive 30 and the pivot base 3.

Figure 6:
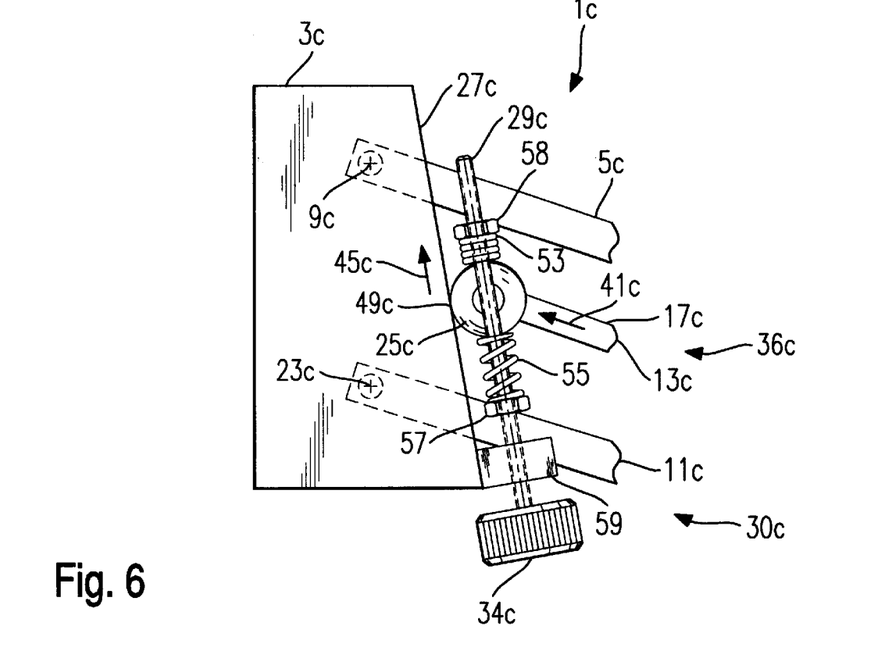
FIG. 6 is a partial view of a fourth embodiment of the pivot mounting assembly according to the invention.

As against that, a pivot mounting assembly 1 c shown in FIG. 6 comprises a threaded sleeve 59 fixed to a pivot base 3c, into which sleeve a threaded spindle 29c can be threaded for fixing the same into position in longitudinal direction thereof to the pivot base 3c. Moreover, two spaced apart support rings 57 and 58 are fixed to the threaded spindle 29c, with two coil springs 53 and 55 being disposed therebetween, the threaded spindle 29c passing through said coil springs. A roller 25c is disposed between the two coil springs 53 and 55, said roller resting against the ends of the coils springs 53 and 55. The roller 25c is rotatably supported on an end 17c of a pressure spring 13c on the pivot base side.

Here, too, a support location 49c where the roller 25c is in contact with a support surface 27c provided on the pivot base 3c adjusts itself through an equilibrium of forces which is produced by a deflection force 45c caused by the pressure force 41c of the pressure spring 13 and counterforces provided by the coil springs 53 and 55 when the roller 25c shifts along the support surface 27c in an area between the two support rings 57 and 58 along the threaded spindle 29c.

Here, the support rings 57, 58, the coil springs 53, 55 and the roller 25c constitute a force-providing device 36c for providing a counterforce to the deflection force 45, while the threaded spindle 29*c*, the threaded sleeve 59 and a twist handle 34*c* constitute a drive 30*c* for shifting the deflection area of the support location 49*c* along the support surface 27*c*. One operative end of the drive 30*c* is fixed to the pivot base 3*c* via the threaded sleeve 59, while the other operative end of the drive 30*c* is coupled to the operative end 17*c* of the pressure spring 13*c* on the pivot base side, with the force-providing device 36*c* being interposed.

Figure 7:
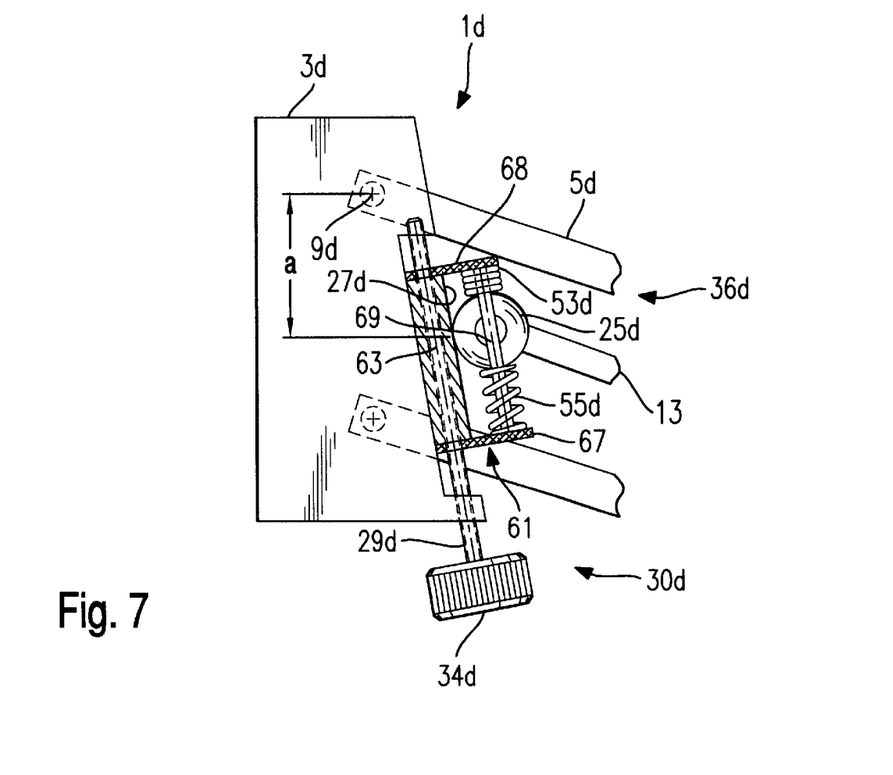
FIG. 7 is a partial view of a fifth embodiment of the pivot mounting assembly according e invention.

A pivot mounting assembly 1*d* shown in FIG. 7 has a structure which is similar to that of the pivot mounting assembly shown in FIG. 6 in that here, too, a roller 25*d* is in contact with springs 53*d* and 55*d* for providing a counterforce to a deflection force. However, in the pivot mounting assembly 1*d*, a support surface 27*d* on which the roller 25*d* may roll is not provided directly at a pivot base 3*d* but on a carriage 61 which is shiftable in respect of the pivot base 3*d* in a direction transverse to the horizontal. The carriage 61 is shifted in respect of the pivot base 3*d* via a drive 30d comprised of a threaded spindle 29*d* which is rotatably supported on the pivot base 3*d* and actuatable via a twist handle 34*d*. The carriage 61 comprises a threaded bore 63 which is traversed by the threaded spindle 29*d*, so that by turning the threaded spindle 29*d*, the carriage 61 is shiftable in respect of the pivot base 3*d* in the direction of the threaded spindle 29*d* and, as a result, the distance a between a pivot axis 9*d* of the pivot arm 5*d* and a support location of the roller 25*d* on the support surface 27*d* is variable to adjust the magnitude of the antitorque moment produced by the pivot mounting assembly to the load to be held.

Furthermore, the forces of a second force-providing device 36*d* mounted on the carriage 61 act on the end 17*d* of the pivot mounting assembly 1*d* on the pivot base side. Said second force-providing device 36*d* comprises spaced apart side pieces 67, 68 which are disposed on the carriage and support a pin 69 positioned between the side pieces 67, 68, said pin extending in a vertical plane and parallel to the support surface 27*d*. The pin 69 traverses coil springs 53*d* and 55*d*, the roller 25*d* being positioned between the face ends thereof facing towards each other. The function of the coil springs 53*d* and 55*d* corresponds to the function of the coil springs 53 and 55 of FIG. 6.

Figure 8:
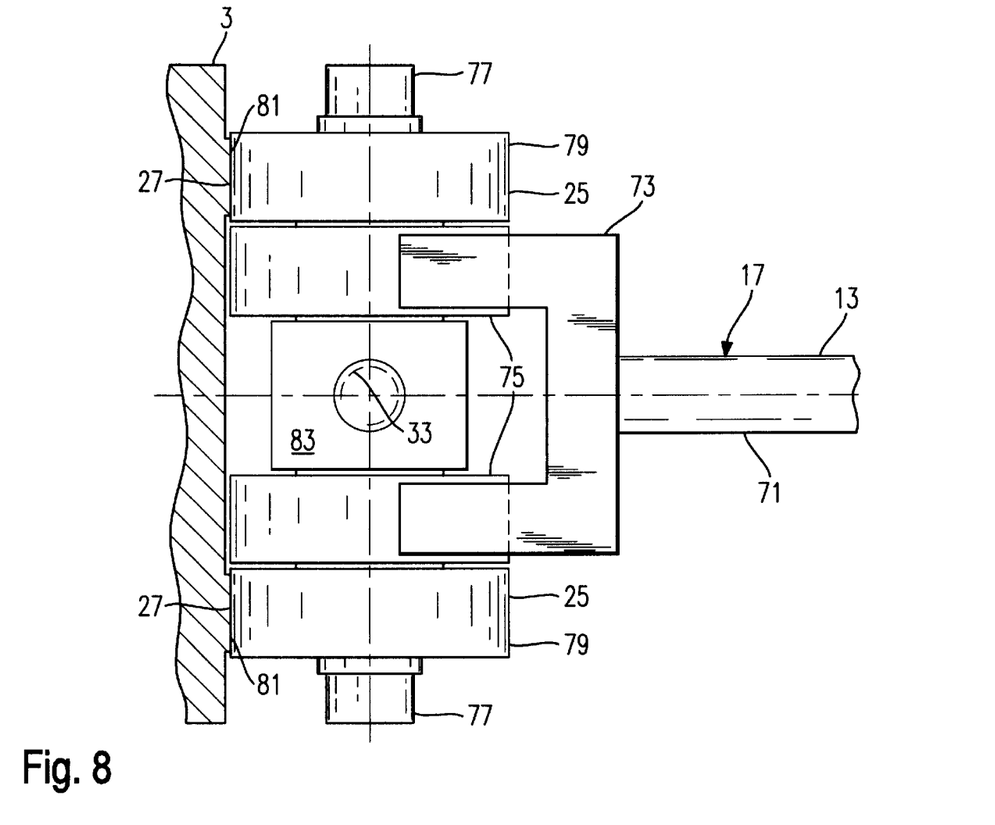
FIG. 8 is a additional view of the embodiments shown in FIGS. 2 and 3.

FIG. 8 is a partial view of the end 17 on the pivot base side and its abutment against the pivot base 3 of the embodiment shown in FIGS. 2 and 3. A yoke 73 is fixed to the end of a telescopic rod 71 of the gas pressure spring 13 and supported on a pair of spaced apart coaxial ball bearings 75. Each ball bearing 75 is traversed by a shaft 77, each shaft 77 supporting a further ball bearing 79 adjacent to the ball bearing 75, said ball bearing 79 forming the roller 25 for supporting the end 17 on the pivot base side of the gas pressure spring 13 on the pivot base 3. Two rails 81 are provided on the pivot base 3 which define the support surface 27 on which the roller 25 rolls. The shafts 77 support on their ends facing towards each other a block 83 which includes the threaded bore 33 which is traversed by the threaded rod 29.

Figure 9:
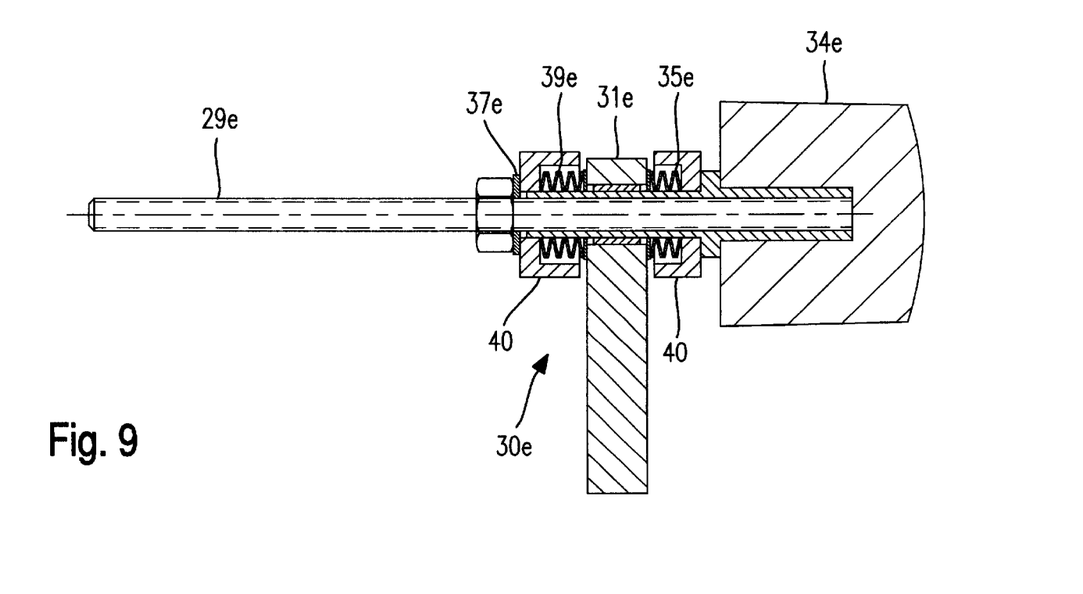
FIG. 9 shows a variant of the force-providing device shown in FIGS. 2 and 3.

FIG. 9 shows a variant of the force-providing device shown in FIGS. 2 and 3. The force-providing device shown in FIG. 9 likewise comprises a threaded rod 29*e* with a twist handle 34*e* attached thereto, the threaded rod 29*e* traversing a shift sleeve 31*e* fixed to the pivot base. A disc spring pack 35*e* is disposed between the shift sleeve 31*e* and the twist handle 34*e*, while a further disc spring pack 39*e* is disposed between the shift sleeve 31*e* and a support ring 37*e* fixed to the threaded spindle 29*e*. The spring packs 35*e* and 39*e* are disposed within ring caps 40 which protectively engage around the spring packs, on the one hand, and serve as end stops for the compression of the spring packs 35*e*, 39*e*, on the other hand.

In the above-described embodiments, the force-providing device for producing the antitorque moment is provided as gas pressure spring. However, any other type of pressure springs, such as a coil pressure spring or a disc pressure spring, is conceivable.

Furthermore, in the above-described embodiments the springs of the force-providing device for providing the counterforce to the deflection force for shifting the support location along the support surface are provided as coil springs. Here, too, other spring types are also conceivable, such as disc springs, extension or compression springs. The counterforce may also be provided by bodies made of an elastic material, such as rubber blocks, which are incorporated into the second force-providing device.

In the above-described embodiments, the first force-providing device is supported on the support surface, with a roller being interposed. However, it is also possible, to support the end on the pivot base side of the first force-providing device on the support surface of the pivot base not by interposing a roller but a slide stone or the like. In this respect, suitable measures for reducing the sliding friction may be taken.

What is claimed is:

1. A pivot mounting assembly comprising:

a pivot arm for mounting a load in a vertically adjustable manner, said pivot arm being hinged to a pivot base to be pivotable about a horizontal axis, a first force-providing device which is hinged with a first one of its two operative ends to the pivot arm spaced apart from the horizontal axis and which is supported with a second one of its two operative ends on the pivot base at a support location which is vertically spaced apart from the horizontal axis by a distance for providing an antitorque moment to at least partially compensate for a torque imparted by the load on the pivot arm, wherein the pivot base is provided with a support surface which extends transverse to the horizontal direction and has a shift area in which the support location is shiftable along the support surface, wherein the support surface is oriented in the shift area such that, when the support location is disposed in the shift area and the pivot arm is raised, a downwardly directed deflection force acts on the operative end of the first force-providing device supported on the pivot base for shifting the support location, and, when the pivot arm is lowered, an upwardly directed deflection force acts on the operative end of the force-providing device supported on the pivot base for shifting the support location, and a second force-providing device for generating a counterforce to the downwardly or/and upwardly directed deflection force, said counterforce acting on the end of the first force-providing device supported on the pivot base, with the support location being disposed in at least a partial area of the shift area.

2. The pivot mounting assembly according to claim 1, wherein the second force-providing device is a double-acting force-providing device which provides a counterforce acting on the end of the first force-providing device supported on the pivot base when the same is deflected from a center of the shift area thereof, said counterforce being directed towards said center.

3. The pivot mounting assembly according to claim 1, wherein the second force-providing device comprises at least one pressure spring.

4. The pivot mounting assembly according to claim 1, wherein the second force-providing device comprises at least one tension spring.

5. The pivot mounting assembly according claim 1, wherein a drive is provided for shifting the shift area as such in vertical direction and for adjustably varying the antitorque moment.

6. The pivot mounting assembly according to claim 5, wherein the antitorque moment is variable in a predetermined range and wherein forces provided by the first force-providing device and the second force-providing device are adjusted to each other such that, with a small antitorque moment, the deflection force for shifting the support location is smaller than the maximum counterforce of the second force-providing device.

7. The pivot mounting assembly according to claim 5, wherein a pair of end stops is provided for limiting the shift area as partial area of the support surface, and wherein the pair of end stops is vertically movable by the drive.

8. The pivot mounting assembly according to claim 5, wherein the drive is coupled with one of its operative ends to the end of the first force-providing device which is supported on the pivot base and is hinged with its other operative end to the pivot base, with the second force-providing device being interposed.

9. The pivot mounting assembly according to claim 5, wherein the drive is hinged with one of its two operative ends to the pivot base and is coupled with its other operative end to the end of the first force-providing device which is supported on the pivot base, with the second force-providing device being interposed.

10. The pivot mounting assembly according to claim 7, wherein at least one of the pair of end stops is provided by a pressure spring of the second force-providing device.

11. The pivot mounting assembly according to claim 5, wherein the drive is a spindle drive, the spindle of which traverses coil springs of the second force-providing device in longitudinal direction thereof.

12. The pivot mounting assembly according to claim 5, wherein the support surface is provided on a carriage which is vertically shiftable by means of the drive.

13. The pivot mounting assembly according to claim 1, wherein the support surface extends partially orthogonal to an extension direction of the pivot arm if the same is partially raised from a horizontal position.

* * * * *

UNITED STATES PATENT AND TRADEMARK OFFICE
CERTIFICATE OF CORRECTION

PATENT NO. : 6,523,796 B2
DATED : February 25, 2003
INVENTOR(S) : Heinz Abramowsky et al.

It is certified that error appears in the above-identified patent and that said Letters Patent is hereby corrected as shown below:

<u>Title page,</u>
Item [57], ABSTRACT,
Line 11, between the words "force" and "the", please insert the word -- to --.

<u>Column 4,</u>
Line 10, between the words "mounting" and "according", please insert the word -- assembly --.
Line 17, between the words "according" and "invention", please insert the phrase -- to the --.
Line 18, between the words "is" and "additional", please insert the word -- an --.
Line 44, replace "form" with -- from --.

<u>Column 5,</u>
Line 7, replace "2" with -- 25 --.
Line 10, replace "al" with -- a1 -- which is an element number and should be in bold print.
Line 11, "a2" is an element number and should be in bold print.
Line 11, "a3" is an element number and should be in bold print.

Signed and Sealed this

First Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,523,796 B2
DATED : February 25, 2003
INVENTOR(S) : Heinz Abramowsky et al.

It is certified that error appears in the above-identified patent and that said Letters Patent is hereby corrected as shown below:

<u>Title page,</u>
Item [73], replace "Carl-Zeiss-Stiftung" with -- Carl-Zeiss-Stiftung trading as Carl Zeiss --.

Signed and Sealed this

Eighteenth Day of November, 2003

JAMES E. ROGAN
*Director of the United States Patent and Trademark Office*